June 7, 1927.
D. L. H. VAN RAALTE
1,631,564
VALVE FOR MAKING CONNECTION BETWEEN UNDERGROUND MAIN PIPING AND
UNDERGROUND BRANCH PIPING
Filed July 16, 1926
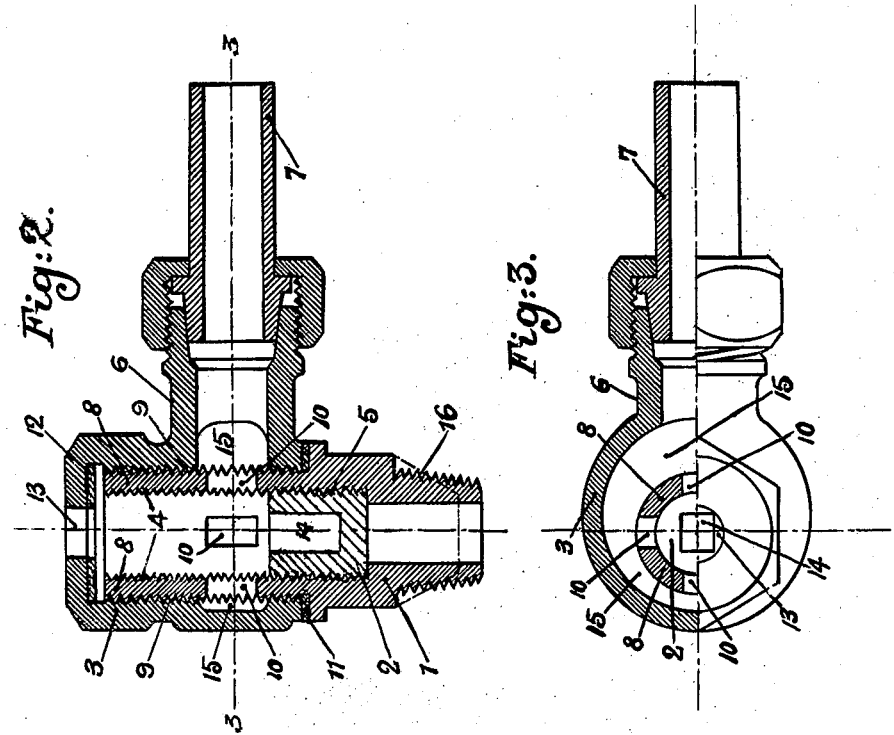
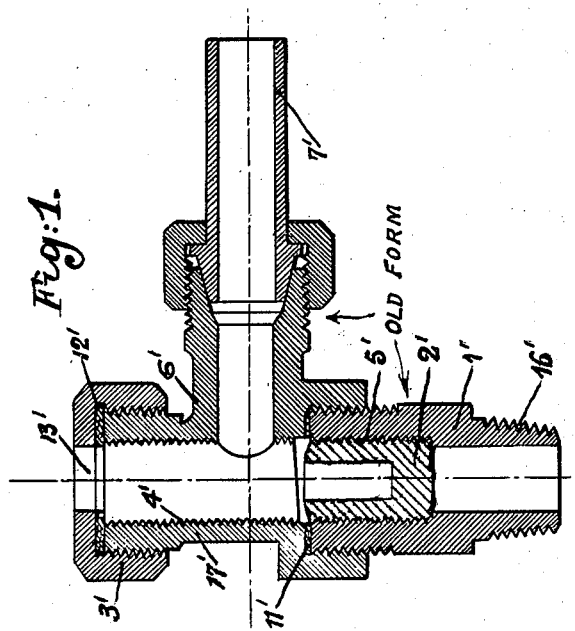
Inventor:
Diederik Lodewijk Hendrik
van Raalte.
by W. Rask,
his Attorney.
Witnesses:
W. G. Izeren.

Patented June 7, 1927.

1,631,564

UNITED STATES PATENT OFFICE.

DIEDERIK LODEWIJK HENDRIK VAN RAALTE, OF VLISSINGEN, NETHERLANDS.

VALVE FOR MAKING CONNECTION BETWEEN UNDERGROUND MAIN PIPING AND UNDERGROUND BRANCH PIPING.

Application filed July 16, 1926, Serial No. 122,839½, and in Germany July 14, 1925.

This invention relates to improvements in valves of that type which are used for making connection with underground mains while the latter are carrying fluid at working pressure. In tapping mains while they are under working pressure it is customary to use a special drilling and threading device into which a plug constituting a part of the valve structure is inserted, the drilling and threading operation and the insertion of the plug being mechanically accomplished without the loss of fluid or pressure from the main. It is, of course, essential that the plug be temporarily closed at the time of its insertion into the threaded hole of the main and that the stopper which forms the closure be afterward withdrawn in such a manner as to permit communication between the bore of the plug and the branch conduit to which the valve is connected.

A well-known form of valve used in making such connections with a main under pressure is known as the Morris valve. The present invention is an improvement on the Morris valve and successfully overcomes certain disadvantages and faults inherent in the construction and design of the Morris valve.

In order clearly to distinguish the new from the old, Fig. 1 of the drawings illustrates an axial section through an ordinary Morris valve while Fig. 2 is a similar view of a valve embracing the principles of the present invention, Fig. 3 being in part a section taken along the line 3—3 of Fig. 2, and in part a plan view of said Fig. 2.

Before adverting to the structure of the present invention it will be noted that the Morris valve illustrated in Fig. 1 consists essentially of a valve casing made in three parts, part 1', this being the plug which is inserted in the drilling machine and temporarily closed by the stopper 2'; part 17' which is screwed upon part 1' after the removal of the drilling machine and which is formed with a branch nipple 6'; and part 3', a cap which screws upon the part 17' and is provided within its flanged end with a packing element 12'. A packing 11' is interposed between the parts 1' and 17'.

It will be noted that a threaded bore is provided within the plug 1' and part 17' for the traverse of the stopper 2' and that access is had to said stopper 2' through a hole 13' in the top of the cap. By the insertion of an appropriate tool in the hole 13' and in polygonal recess within the stopper 2', the latter may be rotated by manipulation of the tool so as to be advanced from the position shown in Fig. 1 upwardly within the threaded bore until it abuts against the packing 12' with which it is supposed to make a fluid tight joint.

Now, in practice, two untoward circumstances are likely to happen unless the thread 3' in the plug 1' and the thread 4' within the part 17' are in exactly the proper relative phase. When the stopper 2' is screwed out it will jam against the thread 4' so that it will tend to cause rotation of the part 17' producing a leak at the packing 11' or in the event that part 17' successfully resists the tendency to rotate the threads of the stopper or the internal thread 4' may be stripped. Supposing however, that the stopper 2' is successfully advanced until it abuts against the packing 12', further advance of said stopper will cause the cap 3' to rotate with respect to the part 17' of the valve casing producing a leak at the packing 12'.

Turning now to the present invention, 1 designates the screw plug, 2 the stopper, while the valve casing is designated by the numeral 3. It will be observed that the valve casing 3 is formed with an integral cap and that the plug 1 is formed with an extension 8 reaching almost to the top of the valve casing. Said extension is threaded both externally and internally, the internal thread which is designated as 4 being adapted for the traverse of the stopper 2. The valve casing is screwed upon the external thread substantially throughout the length thereof giving a long joint to resist leakage with the exception of an intermediate part where an annular channel 15 is formed communicating with ports 10 in the extension 8 and with the lateral branch nipple 6. A packing 12 lies within the top of the valve casing 3 and another packing 11 is interposed between the valve casing and the plug 1.

It is obvious that the thread which must be traversed by the stopper 2 in traveling from the seated position in which it is shown to a seating position against the packing 12, is continuous so that there is no jamming nor is there any tendency to loosen the valve casing with respect to the plug as is the case in the old form of valve. Furthermore, since the cap is integral with the valve casing there is no tendency for the cap to rotate under the friction of the stopper 2, loosening it with respect to the valve casing. The packing 12 is solely for the purpose of making a fluid tight seat with the stopper 2 and preferably plays no part in sealing the joint between the extension and the valve casing, this joint being effectively sealed by the long leakage path provided by the threaded connection between the valve casing and extension and by the packing 11.

After installation of the valve the stopper 2, is advanced along the extension 8 in the same manner as in the Morris valve by inserting an appropriate tool through the hole 13 in the top of the valve casing and into a polygonal recess 14 in the stopper. The extension 8 is made of sufficient length so that when the stopper is transferred from the seated position within the plug as shown to its normal position in fluid tight contact with the packing 12 it will be entirely above the ports 10 permitting unrestricted flow of fluid through said ports.

Claims:

1. A valve including a screw plug having an external shoulder affording a seat for a packing and being provided interiorly with a bore and a larger counterbore, the wall of the latter being threaded, the junction of said bore and counter-bore forming a shoulder, said screw plug being formed with lateral ports in a zone intermediate the length of said counter-bore, a one piece casing screwing upon said screw plug having the lower end thereof adapted to form a fluid tight joint with the packing on said external shoulder, said casing being formed with a perforated cap, a packing within said cap, said casing having a lateral passage communicating with said ports, a stopper threaded within said counter-bore having valve seats at its opposite ends engageable alternatively with said internal shoulder and the packing within said cap, said casing being of such depth as to maintain a space between the packing in the cap and the end of the screw plug when the lower end of said casing is in fluid tight relation with the external shoulder.

2. A valve including a screw plug having an external shoulder affording a seat for a packing and being provided interiorly with a bore and a larger counter-bore, the wall of the latter being threaded, the junction of said bore and counter-bore forming a shoulder, said screw plug being formed with lateral ports in a zone intermediate the length of said counter-bore, a one piece casing screwing upon said screw plug having the lower end thereof adapted to form a fluid tight joint with the packing on said external shoulder, said casing being formed with a perforated cap, a packing within said cap, said casing having a lateral passage communicating with said ports, a stopper threaded within said counter-bore having valve seats at its opposite ends engageable alternatively with said internal shoulder and the packing within said cap, said casing being of such depth as to maintain a space between the packing in the cap and the end of the screw plug when the lower end of said casing is in fluid tight relation with the external shoulder, said stopper being of such length as to be entirely below the zone of said ports when seated upon said internal shoulder.

In testimony whereof I have affixed my signature.

DIEDERIK LODEWIJK HENDRIK VAN RAALTE.